Jan. 24, 1967 T. R. STOCKTON 3,300,001

TRANSMISSION BRAKING ARRANGEMENT

Filed Dec. 30, 1963 2 Sheets-Sheet 1

Thomas R. Stockton
INVENTOR.

BY John R. Faulkner
Robert E. McCollum

ATTORNEYS

TRANSMISSION BRAKING ARRANGEMENT

Filed Dec. 30, 1963 2 Sheets-Sheet 2

Thomas R. Stockton
INVENTOR.

BY John R. Faulkner
Robert E. McCollum
ATTORNEYS

United States Patent Office 3,300,001

Patented Jan. 24, 1967

1

3,300,001

TRANSMISSION BRAKING ARRANGEMENT

Thomas R. Stockton, Northville, Mich., assignor to Ford Motor Company, Dearborn, Mich., a corporation of Delaware Filed Dec. 30, 1963, Ser. No. 334,149
7 Claims. (Cl. 192—4)

This invention relates to a parking brake mechanism. More particularly, it relates to one for use with an automatic transmission.

In the past, automatic transmissions have generally included a separate toothed or cog wheel on the power output shaft that was selectively engaged by a stationary external member for positively braking the power output shaft to prevent the vehicle from moving. The addition of this wheel, however, is a cost disadvantage, not only because of the additional cost of the wheel per se, but also the cost of the additional transmission housing necessary to enclose the wheel and its associated operating parts.

The present invention makes use of the existing physical parts of the transmission to provide a parking brake mechanism without adding a separate cog wheel on the power output shaft or extending the transmission housing. In automatic transmissions, the various connections between the input and output shafts and the drive and driven gear elements, as well as the supports for the other gear elements, generally provide a number of external drum-like surfaces. The invention utilizes these surfaces to provide a positive braking of the output shaft by forming at least two of these surfaces with cog teeth that can be engaged by grounded pawls to lock the gearset against movement. The two members are engaged in sequence, and can be engaged even though the vehicle is in motion. The sequence is such that the gear carrying the greatest torque load, which is generally a reaction member, is engaged first, followed by the engagement of the remaining gear member dynamically at a lighter load while the vehicle is in motion.

The construction provided by the invention lessens the cost of the transmission arrangement, and reduces the overall length of the transmission housing, while still providing a positive brake of the power output shaft.

One of the objects of the invention, therefore, is to provide a positive braking assembly for the power output shaft of an automatic transmission.

Another object of the invention is to provide a positive braking of a power output shaft of an automatic transmission by sequentially braking the rotation of at least two members of the gearset.

It is a still further object of the invention to provide a parking brake assembly of the type described; wherein, a single operating lever sequentially engages a number of stationary pawls with teeth on a plurality of rotatable gears to positively prevent rotation of the power output shaft; the single operating means having a cam common to cam follower means on each of the parking pawls, the cam follower means being different for each pawl.

Other objects, features, and advantages of the invention will become apparent upon reference to the succeeding detailed description thereof, and to the drawings illustrating the preferred embodiments thereof; wherein, FIGURES 1 and 2 are schematic cross-sectional views of two different forms of transmissions embodying the invention;

2

Figure 1:
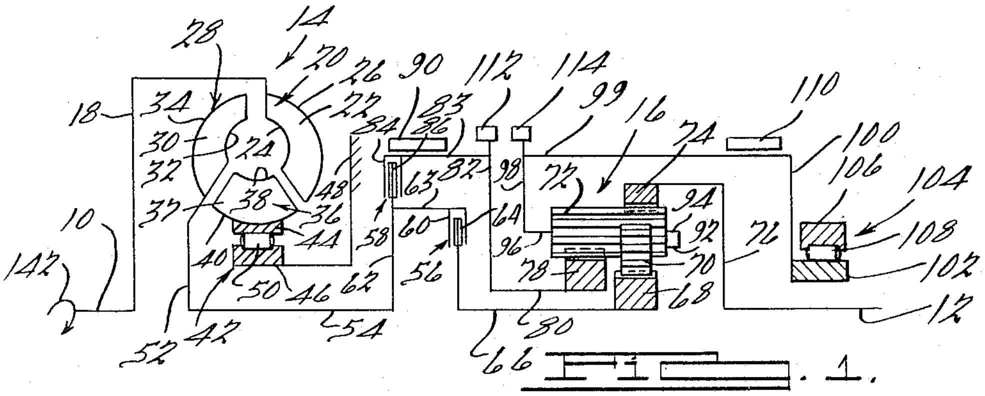

FIGURE 1 shows one form of a transmission embodying the invention, having power transmitted from an input shaft 10 to an output shaft 12 through a hydrodynamic torque converter 14 and a planetary gearset 16. More specifically, shaft 10 is driven by any suitable source of power, such as, for example, the internal combustion engine for a motor vehicle. It is connected by an annular shell 18 to a rotatable impeller or pump 20 constituting one element of the torque converter 14. The impeller consists of a number of spaced blades 22 secured between the inner and outer annular shrouds 24 and 26. The impeller faces a turbine member 28 similarly consisting of spaced blades 30 secured between inner and outer annular shrouds 32 and 34. The torque converter also includes a stator or reaction member 36 having blades 37 secured between inner and outer annular shrouds 38 and 40.

The stator is prevented from rotating in a direction opposite to the direction of rotation of the pump or turbine by means of an overrunning type coupling 42. This coupling includes an outer annular race 44 secured to shroud 40, and an inner annular race 46 secured to a stationary portion 48 of the transmission. The races are separated by spaced rollers or sprags 50. The device is a one-way brake, and operates in a known manner. The rollers or sprags wedge the two races together upon rotation of the stator in a direction opposite to that of pump 20, and unlock upon a reversal in rotation of the stator.

The inner and outer shrouds of the impeller, turbine, and stator members together define a toroidal path for the circulation of operating fluid therebetween in a known manner. At low speeds, a multiplication of the torque transmitted between the element is obtained by the holding of stator 36 stationary. At higher speeds, the stator rotates freely, and the unit acts as a fluid coupling.

Turbine 28 is connected by a radial flange 52 to one end of a shaft 54 constituting the input member to the planetary gearset 16. The turbine input torque is divided into two paths by means of two selectively engageable, fluid pressure actuated clutches 56 and 58. Clutch 56 has a plurality of friction discs 60 secured to extensions 62 and 63 of shaft 54, the discs being interleaved with a similar friction disc 64 secured to one end of an intermediate shaft 66. The opposite end of this shaft supports a sun gear 68.

The gearset is of the intermeshing planet pinion type having a short pinion gear 70 meshing with sun gear 68 and a long pinion gear 72. The long pinion meshes with a ring gear 74 and with a second sun gear 78. The ring gear is secured to output shaft 12 by an extension 76, while sun gear 78 is rotatable with a shaft 80. This shaft has drum-like extensions 82 and 83 which constitute the driven portion of clutch 58.

The clutch has a plurality of annular friction discs 84 secured to extension 83 and interleaved with a friction disc 86 fixed to the radial extension 62 of shaft 54. Both clutches 56 and 58 are adapted to be engaged by fluid under pressure in a known manner, and are disengaged by suitable spring means, not shown. The external surface of drum portion 83 is formed with a friction material for cooperation with a fluid pressure actuated brake band 90. Band 90, like clutches 58 and 56, is of the fluid pressure actuated, spring released type.

Both the short and long planet pinion gears 70 and and 72 are rotatably mounted on pinion shafts 92 and 94, secured in a rotatable carrier 96. The carrier has drum-like extensions 98 and 99 enclosing the gearset, the portion 99 being fixed by a flange 100 to the inner annular race 102 of an overrunning coupling 104. This coupling, like coupling 42, is a one-way brake for preventing rotation of the carrier 96 in a direction opposite to that of the pump and turbine members 20 and 28, while permitting free rotation in a clockwise or forward direction. The brake includes an outer annular race 106 separated from race 102 by spaced sprags or rollers 108. The brake operates in the same manner as brake 42. The outer surface of the extension 99 is provided with suitable friction material for cooperation with an annular brake band 110 for preventing rotation of the carrier in either direction. This brake, like brake 90, is of the fluid pressure actuated, spring released type.

Figure 3:
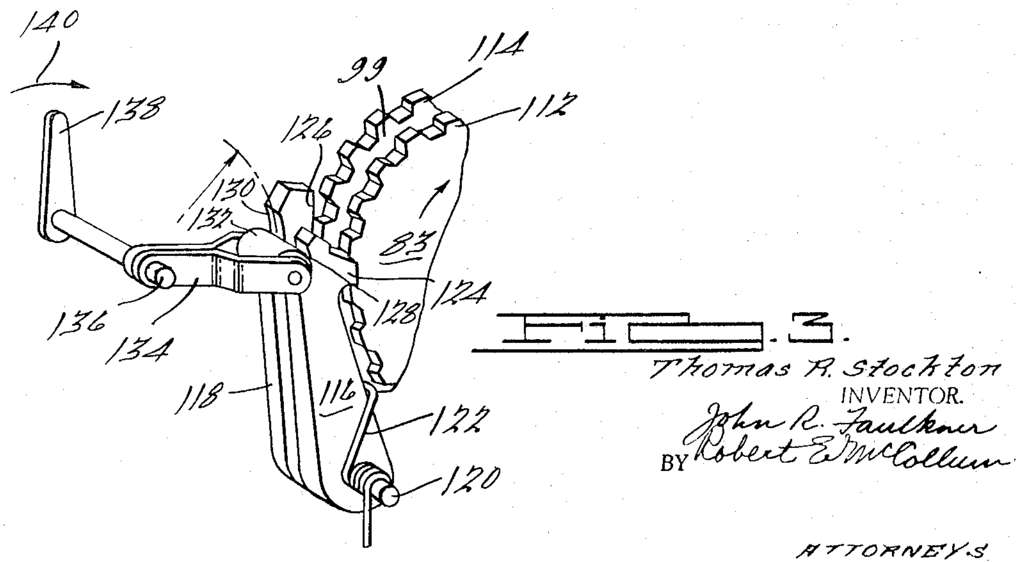
FIGURE 3 is a schematic perspective view of a portion of a braking assembly embodying the invention, viewed from the front of the transmission looking rearwardly.

As stated previously, the invention is concerned primarily with providing means for braking the gearset to provide a positive braking of the power output shaft 12 and thus prevent movement of the vehicle. For this purpose, both drum-like extensions 83 and 99 have teeth 112 and 114 formed on their external portions (see also FIGURE 3) for individual cooperation with pawl members 116 and 118, respectively. As best seen in FIGURE 3, the pawls are rotatably mounted on a shaft 120, and normally biased by a spring 122 to positions out of engagement with the teeth 112 and 114. The teeth 124 and 126 of the pawls are formed with converging face portions permitting a ratcheting action of the teeth with respect to the cog teeth 112 and 114.

The back edges of the pawls are provided with arcuate cam follower surfaces 128 and 130, engaged at all times by a cam 132. This cam is common to both of the cam follower surfaces, and is rotatably mounted between the arms of a yoke 134 secured to a shaft 136. This shaft, in turn, is fixed to one end of an operating lever 138, so that upon clockwise rotation of the lever in the direction of the arrow 140, cam 132 will bear against the cam follower surfaces to engage the pawls with the respective teeth on the drum extensions 83 and 99.

The depth of surface 128 is greater than that of surface 130, so that the two pawls will be sequentially engaged by the cam 132 as it moves along the arcuate surfaces. That is, the pawl 116 has a lost motion-like connection to the cam 132. As the cam 132 is rotated, the pawl 118 is first engaged and rotated into engagement with the cog teeth of extension 99 to brake the carrier 96. Subsequently, upon continued rotation of cam 132, the pawl 116 is engaged with the cog teeth of extension 83 to brake the sun gear 78. This sequential operation is preferably such that, as will appear more clearly later, the gear member carrying the largest torque load, which in this case is the reaction gear, will be engaged first, and the gear rotating under a lighter load, will be engaged secondary, even though the vehicle may be in motion.

In overall operation, Neutral is established by disengaging the bands 90 and 110, and the clutches 56 and 58. While a drive of output shaft 10 will drive impeller 20, turbine 28, and thus shaft 54 in a clockwise direction as indicated by the arrow 142, no drive will be transmitted to the gearset. At this time, the brake actuating lever 138 can be rotated in the direction of the arrow 140 to sequentially engage pawls 118 and 116 with the extensions for the sun gear 78 and carrier 96, thus positively preventing rotation of output shaft 12.

Low or First speed forward drive is established by rotating brake lever 138 to disengage the parking pawls 116 and 118 from the members 82 and 98, and engaging forward clutch 56 alone. Clockwise rotation of input shaft 10 rotates pump 20, turbine 28, shaft 54, shaft 66, and sun gear 68 in the same direction. Pinions 70 rotate in a counterclockwise direction tending to drive pinions 72 clockwise. Since the load on output shaft 12 initially resists forward rotation of this gear, pinions 72 attempt to rotate in a counterclockwise direction. However, this is prevented by engagement of one-way brake 104, thereby causing the ring gear 74 and output shaft 12 to be driven in a forward direction. The carrier 96 at this time acts as a reaction member for the gearset.

Second or Intermediate speed forward drive is engaged from Low by subsequently applying intermediate brake 90. Clockwise rotation of input shaft 10 then rotates sun gear 68 in the same direction to rotate pinions 72 and ring gear 74 in the same direction. Sun gear 78 is now held stationary by brake 90, and becomes the reaction member for the gearset, forcing pinions 72 to walk clockwise around the stationary sun gear and drive the carrier 96 in a clockwise direction. Brake 104 unlocks to permit this rotation. The ring gear 74 and output shaft 12, therefore, are driven forwardly faster than they were during Low speed operation.

Third speed or Direct drive is established by engaging both clutches 56 and 58, and disengaging bands 90 and 110. At this time, the rotational speed of turbine 28 will have caused the stator 35 to rotate in a forward direction, which movement is permitted by the overrunning action of the one-way brake 42. The converter 14, therefore, now acts as a fluid coupling, merely transmitting the torque of the input shaft 10 to shaft 54 without torque multiplication. Continued rotation of shaft 10, pump 20, turbine 28 and shaft 54 rotates both sun gear 68 and sun gear 80 at the same speeds. The gearset thus locks up, providing a direct drive through it from the turbine 28 to the output shaft 12.

Reverse drive may be established by engaging brake band 110 and clutch 58, while disengaging band 70 and clutch 56. Clockwise rotation of input shaft 10, the converter 14, and shaft 54 drives sun gear 78 in the same direction. Since carrier 96 is held stationary by brake 110, the counterclockwise rotation of pinions 72 rotates ring gear 74 and output shaft 12 in a reverse or counterclockwise direction, and at a speed reduced from that of input shaft 10. Pinion gear 70 and sun gear 68 merely idle at this time.

As will be clear from the above description, the parking brake condition can be established during neutral, low and reverse speed drives simply by rotating the parking brake member lever 138. This first engages the drum 83 of sun gear 78 to brake its rotation, and subsequently engages the extension of the carrier 96 to brake its rotation, and thus brake the entire gearset and output shaft 12.

If it is desired to apply the Parking brake during low speed operation, the carrier 96 will normally be stationary, although it could be rotating forwardly off the one-way brake 104 if the transmission is in a coast condition where output shaft 12 becomes the driver. The rotation of lever 138 therefore initially brakes the gear carrying the largest torque load, which is the carrier reaction member. The gearset is now conditioned for a Low speed forward drive in either direction. Continued movement of lever 138 then brakes the rotating sun gear 78, which establishes simultaneously a combined Low and Intermediate speed drive, to brake the gearset and output shaft 12 against rotation in either direction.

If a Park condition is desired while the vehicle is established for a Reverse operation, the initial movement of lever 138 brakes the carrier reaction member, followed by the engagement of the pawl 116 dynamically with the extension of sun gear 78 to positively prevent rotation of output shaft 12.

It should be noted that during the changes from Low to Second or Third speed forward drives, that the respective clutches and bands will be engaged and disengaged in timed relationship to each other to provide smooth shifts between drive ranges. The one-way brake 104 provides a smooth change between Low and Intermediate speed drives by the automatic disengagement or engagement of this brake. This timed relationship engagement also applies to the form of transmission shown in FIGURE 2.

Figure 2:
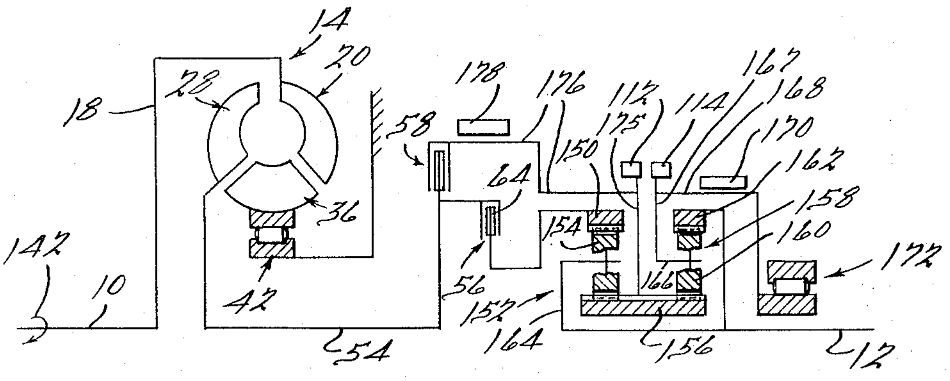

FIGURE 2 shows another form of a transmission embodying the invention, this figure showing two planetary gearsets instead of the one of FIGURE 1. In all other respects, as to construction and operation, the transmissions of FIGURES 1 and 2 are similar. The details, therefore, will not be repeated.

In FIGURE 2, the input torque from turbine 28 is again divided to the gearsets by the two friction clutches 56 and 58. The connections to and between the elements of the gearsets, however, is different. The driven clutch disc 64 is drive connected to the ring gear 150 of a first planetary gearest 152. This gearset has a number of planet pinion gears 154 meshing with the ring gear and a long sun gear 156 that serves both gearsets. That is, it also serves as the sun gear for a second gearset 158 having planet pinions 160 meshed therewith and with a ring gear 162. The pinions 154 are rotatably mounted in a carrier 164, which is fixed to the ring gear 162 and also to the power output shaft 12. The pinions 160 are rotatably supported in a carrier 166 having drum-like extensions 167 and 168.

Extension 168 is adapted to be engaged either by a fluid pressure actuated band 170 similar to brake 110 of FIGURE 1, or is automatically held against reverse rotation by a one-way brake 172. This latter brake is of the same construction and operation as one-way brake 104, and locks up upon reverse rotation of the carrier to hold it stationary, while permitting free forward or clockwise rotation of the carrier.

As in FIGURE 1, the carrier extensions 167, 168 are formed externally with cogged teeth 114 for engagement with the teeth 126 of parking pawl 118. The dual sun gear 156 is likewise extended by drum-like member 175, 176 constituting the driven portion of the clutch 58. A fluid pressure actuated, spring released brake band 178 at times engages the drum to hold the sun gear stationary. A number of cogged teeth 180 are formed on the external portion of extension 176 for cooperation with the teeth 124 of brake pawl 116.

In brief, the operation of the FIGURE 2 construction is as follows.

Neutral and Park conditions are obtained by disengaging bands 178 and 170 and clutches 56 and 58, and rotating brake lever 138 to engage both parking pawls 118 and 116 in sequence with the extensions of sun gear 156 and carrier 166. The output shaft 12, therefore, is positively prevented from rotating.

First or Low speed forward drive is established by engaging the forward clutch 56, and releasing the pawls 116 and 118 from engagement. With output shaft 12, carrier 164, and ring gear 162 initially acting as reaction members, forward or clockwise rotation of shaft 10 drives ring gear 150 in the same direction to attempt to rotate carrier 166 in a reverse direction. This is prevented by one-way brake 172, resulting in a forward drive of output shaft 12 at a speed reduced from that of turbine 28.

Second and Intermediate forward drive is established from Low speed operation by subsequently engaging band 178. The forward drive of ring gear 150 from shaft 10 rotates pinions 154 clockwise about the stationary sun gear 156 to rotate carrier 164, ring gear 162, and output shaft 12 in a forward direction at a speed faster than that provided by Low speed operation. One-way brake 172 automatically releases to permit forward rotation of carrier 166.

Third speed or Direct forward drive is established from Intermediate speed drive by subsequently disengaging brake band 178 and engaging clutch 58 to thereby drive ring gear 150 and sun gear 156 at the same speeds. The gearset locks up and a direct drive from turbine 28 to shaft 12 is provided.

A Reverse drive is established by engaging band 170 and clutch 58, while disengaging band 178 and clutch 56. Forward rotation of sun gear 156 rotates pinion gears 158 in a counterclockwise or reverse direction about the stationary carrier 166, gear 162 and shaft 12 in the same direction and at a speed reduced from that of shaft 10.

The parking brake mechanism may be engaged during Low and Reverse speed operations in essentially the same manner as described in connection with FIGURE 1. When the brake lever 138 is rotated to engage the parking pawl 118 with the teeth 114 on the carrier extension 168, a two-way Low speed drive is established. The subsequent engagement of pawl 116 with the rotating sun gear 156 positively brakes the rotation of the output shaft 12, and thereby prevents vehicle motion. When both parking pawls are engaged, a combined Low and Intermediate speed drive is established, thus preventing the gearset from operating.

It should be noted that, in either of the FIGURE 1 or 2 constructions, coast or hill braking may be provided during low speed operation by applying band 110 in FIGURE 1, or 170 in FIGURE 2, to prevent rotation of the carrier in either direction, thus providing engine braking to retard the driving of the gearset by the output shaft 12.

Figures 4, 5:
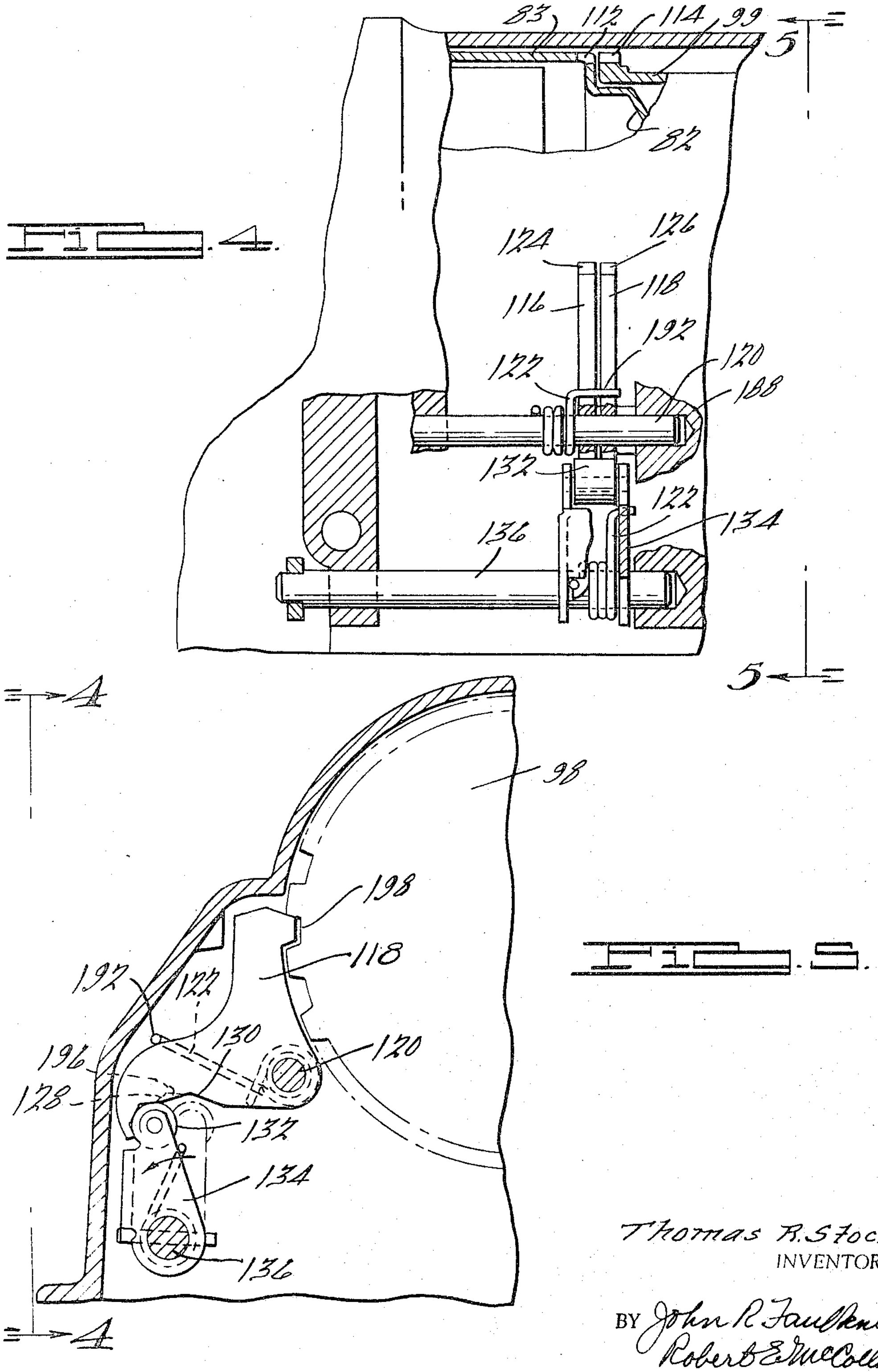
FIGURE 4 is a cross-sectional view of a portion of another braking assembly embodying the invention taken on a plane indicated by and viewed in the direction of the arrows 4—4 of FIGURE 5.
FIGURE 5 is a cross-sectional view taken on a plane and viewed by the direction of the arrows 5—5 of FIGURE 4.

While FIGURE 3 illustrates the braking mechanism of the invention essentially in schematic form, FIGURE 4 and 5, which are essentially to scale, show cross-sectional views of a more detailed construction. As shown in these figures, the sun gear and carrier extensions 83 and 99 are shown with their respective teeth 112 and 114 adapted to cooperate with the teeth 124 and 126 of the two parking brake pawls 116 and 118. These pawls are both rotatably mounted about a pivot pin 120 mounted in the transmission casing 188, and are biased to a released or tooth disengaging position by means of a spring 122. The spring is fixed at one end, and has the other end 192 bearing against the front edge of the pawls. The lower edge portions of the parking pawls are provided with the cam follower surfaces 128 and 130 adapted to be engaged simultaneously by the cam 132 mounted in the yoke or clevis 134. As stated previously, the clevis is fixed for rotation with a shaft 136 rotatably mounted in the transmission housing. A spring 194 biases the clevis in a direction to maintain the cam 132 in engagement with the cam follower surfaces.

As will be seen from FIGURE 5, the cam follower surface 128 of pawl 116 is so located and shaped with respect to the surface 130 of lever 118 that the cam 132 will initially engage the pawl 118 in its counterclockwise teeth engaging rotation. The surface 128 has a recessed portion 196 so that pawl 116 is held out of engagement position until after the cam 132 has moved the pawl 118 into its engaging position with the cog teeth on the extension of carrier 96. The continued counterclockwise rotation of clevis 134 then forces the teeth of pawl 116 into the space between the teeth 198 of the extension 83 of sun gear 78. A sequential disengagement of the pawls, of course, occurs upon movement of the brake lever in the opposite direction.

From the foregoing, it will be seen that the invention provides a parking brake assembly that not only simplifies construction, but reduces the cost of transmission arrangements; the invention eliminates the necessity of providing a separate toothed wheel on the power output shaft of a motor vehicle automatic transmission, and also eliminates an additional extension to the tailshaft housing.

While the invention has been illustrated in its preferred embodiments in the drawings, it will be clear to those skilled in the arts to which the invention pertains that many changes and modifications may be made thereto without departing from the scope of the invention.

I claim:

1. A transmission, comprising, power input and output shafts, planetary gear means connecting said shafts to provide a plurality of drives therebetween, said gear means having a plurality of rotatable members at least a pair of which are formed with teeth thereon in addition to the gear teeth, a pair of non-rotating pivotally movable parking brake pawl means, movable means movable sequentially and cumulatively into engagement with each of said pawl means for the sequential and cumulative pivotal movement of said pawl means into engagement with said additional teeth of said pair of rotatable members for braking the rotation of said output shaft, and means moving said movable means.

2. A transmission comprising, power input and output shafts, planetary gear means connecting said shafts to provide a plurality of drives therebetween, said gear means having a plurality of rotatable members including a reaction member, one of said rotatable members and said reaction member being formed with teeth thereon in addition to the gear teeth, a pair of non-rotating pivotally movable parking brake pawl means, movable means sequentially and cumulatively engageable with individual ones of said pawl means for pivotally moving said pawl means sequentially and cumulatively into engagement with said additional teeth of said reaction and rotatable members for braking the rotation of said output shaft, and means to move said movable means.

3. A transmission, comprising, power input and output shafts, planetary gear means connecting said shafts to provide a plurality of drives therebetween, said gear means having rotatable drive and driven and reaction members, said drive and reaction members being formed with teeth thereon in addition to the gear teeth, a pair of individual non-rotating pivotally movable parking brake pawl means for individual cooperation with the additional teeth on said reaction and drive members, movable means sequentially and cumulatively engageable with individual ones of said pawl means for pivotally moving said pawl means sequentially and cumulatively into engagement with said additional teeth of said reaction and rotatable members for braking the rotation of said output shaft, and means to move said movable means.

4. A transmission parking brake assembly comprising, in combination, a plurality of selectively rotatable gear members cooperatively constituting portions of said transmission, means fixed to said members for rotation therewith and having external teeth thereon, a plurality of non-rotating pivotally movable tooth pawl elements individually mounted for separate pivotal movement into and out of engagement with the external teeth of individual ones of said members for braking said members, movable means common to said elements and sequentially and cumulatively engageable with said pawl elements for movement of said elements sequentially and cumulatively into engagement with said external teeth, and means to move said movable means.

5. A transmission positive parking brake assembly comprising, in combination, a plurality of selectively rotatable coaxially mounted gear members cooperatively constituting portions of said transmission, means fixed to said members for rotation therewith and having external teeth thereon, a plurality of non-rotating pivotally movable tooth pawl elements individually mounted about a common axis for separate pivotal movement into and out of engagement with the external teeth of individual ones of said members for braking said members, movable cam actuating means common to said elements and sequentially and cumulatively engageable with said individual pawl elements upon movement thereof to move said elements sequentially and cumulatively into engagement with said external teeth, and means to move said cam means.

6. A transmission positive parking brake assembly comprising, in combination, a plurality of selectively rotatable gear members cooperatively constituting portions of said transmission, means fixed to said members for rotation therewith and having external teeth thereon, a plurality of non-rotating tooth pawl elements individually mounted for separate pivotal movement into and out of engagement with the external teeth of individual ones of said members for braking said members, said pawl means each having a cam follower means thereon that differs from the follower means on the remaining of said pawl means, cam means common to said elements and movable sequentially and cumulatively into engagement with said cam follower means moving said pawl elements sequentially and cumulatively into engagement with said external teeth, and means to move said cam means.

7. A transmission positive parking brake assembly, comprising, in combination, a plurality of selectively rotatable gear members cooperatively constituting portions of said transmission, drum means fixed to a pair of said members for rotation therewith and having external teeth thereon, a pair of non-rotating pawl elements each having a tooth and being individually mounted about a common axis for separate pivotal movement of said tooth into and out of engagement with the external teeth of individual ones of said pair of members for braking said members, said pawl means each having a portion extending laterally of said axis to the side of said pawl means opposite the tooth, the said portion of each of said pawl means comprising a cam follower surface, the lateral distance between the tooth and cam follower portion of one of said pair of pawl elements being greater that that of the other of said pawl elements, cam means common to said elements and cam follower surfaces and sequentially and cumulatively engageable with said cam follower surfaces for the sequential and cumulative pivotal movement of said pawl elements into engagement with said external teeth, and means to move said cam means.

References Cited by the Examiner

UNITED STATES PATENTS

| | | | |
|---|---|---|---|
| 1,296,534 | 3/1919 | Landis | 74—765 |
| 1,795,981 | 3/1931 | Ward | 74—765 |
| 2,770,326 | 11/1956 | Wayman | 192—4 X |
| 2,806,389 | 9/1957 | Rosenthal et al. | 192—4 X |
| 2,833,162 | 5/1958 | Forster | 74—752 X |
| 2,896,468 | 7/1959 | Cheek et al. | 74—752 X |
| 3,157,067 | 11/1964 | Tuck et al. | 74—754 |
| 3,190,421 | 6/1965 | Schulz | 74—688 X |

DAVID J. WILLIAMOWSKY, *Primary Examiner.*

J. R. BENEFIEL, *Assistant Examiner.*